April 8, 1952     P. H. LEE     2,591,837
METHOD AND APPARATUS FOR SIGNALING EMPLOYING POLARIZED LIGHTS
Filed March 27, 1946     5 Sheets—Sheet 1

INVENTOR.
Paul H. Lee
BY Donald L. Brown
Attorney

April 8, 1952   P. H. LEE   2,591,837
METHOD AND APPARATUS FOR SIGNALING EMPLOYING POLARIZED LIGHTS
Filed March 27, 1946   5 Sheets-Sheet 2

INVENTOR.
Paul H. Lee
BY
Donald R. Brown
Attorney.

INVENTOR.
Paul H. Lee
BY Donald L. Brown
Attorney

Patented Apr. 8, 1952

2,591,837

UNITED STATES PATENT OFFICE 2,591,837

METHOD AND APPARATUS FOR SIGNALING EMPLOYING POLARIZED LIGHTS

Paul H. Lee, Cambridge, Mass., assignor, by mesne assignments, to the United States of America, as represented by the Secretary of the Navy Application March 27, 1946, Serial No. 657,577

2 Claims. (Cl. 250—7)

This invention relates to the art of signaling and more specifically has reference to method and apparatus for transmitting signals, information, orders, and the like in the form of substantially instantaneous light flashes which are received and converted into electrical impulses used to effect the actuation of an electrical utilization circuit.

Objects of the invention are to provide apparatus for transmitting signals in the form of light flashes of high intensity and substantially instantaneous duration; to provide for the transmission of signals by means of light flashes emanating from one or more flash lamps of the gaseous discharge type and to provide means for predeterminedly firing or discharging such lamps; to provide one or more channels of communication for each flash lamp used in a signaling system by predeterminedly modifying the light emitted by each flash lamp through the use of light filter means which may be selectively positionable in the path of the light emitted by the flash lamp and which may comprise at least one light filter having the ability to predeterminedly polarize light; and to provide optical means in a signaling system wherein signals are transmitted by light flashes whereby to direct light from a flash in a predetermined direction.

Other objects of the invention are to provide signal receiving apparatus having one or more receiving channels each formed by an individual light responsive means, such as a photoelectric cell, which converts received light energy into electrical energy for delivery to an electrical utilization circuit; to provide a signal receiver having a plurality of light responsive means, each capable of converting changes of light energy into changes of electrical energy; to provide means for restricting the exposure of one or more light responsive devices in a signal receiver to light of predetermined characteristics by means of light filters which may comprise at least one filter having the ability to predeterminedly polarize light; to provide, in a signal receiver of the character described, means for amplifying changes of electrical energy produced by any light responsive means thereto for effecting the actuation of a utilization circuit and interpreting means for controlling delivery of the amplified changes of electric energy to such utilization circuit.

Further objects of the invention are to provide a signaling system having a transmitter for effecting the transmission of signals by light flashes of high intensity and substantially instantaneous duration in combination with a receiver spaced therefrom and having light responsive means receiving the light flashes and converting them into electric signals adapted to actuate a utilization circuit, to provide a transmitter in a signaling system of the character described which transmits signals by predeterminedly fired gaseous discharge means such as one or more flash lamps, the light flash from any one of which lamps may be directed in one or more channels of communication formed by light filter means which may include a light polarizer and through which the flash is transmitted to a receiver comprising means for converting each flash into an electric signal employed to actuate an electrical utilization circuit; and to provide a signaling system having in combination a transmitter which transmits signals by light flashes directed through light filter means to produce signals in the form of flashes of light of predetermined characteristics and a receiver spaced from the transmitter and having one or more receiving channels each formed by an individual light responsive means, such as a photoelectric cell, which is capable of converting changes of light energy to changes of electrical energy, together with light filter means for restricting the exposure of each light responsive means to a flash of light of predetermined characteristics which corresponds to the characteristics of light transmitted by the transmitter and, in conjunction therewith, means for amplifying the electric signals produced by the light responsive means for effecting the actuation of an electrical utilization circuit and interpreting means controlling the delivery of the amplified signals to the electrical utilization circuit.

Still further objects of the invention are to provide a method of signaling wherein light flashes of substantially instantaneous duration and high intensity are predeterminedly created and transmitted in a predetermined direction and are received at a distance from their origin, converted into signals in the form of electrical pulses which are amplified and interpreted for controlled delivery to a utilization circuit; to provide a method of signaling comprising predeterminedly generating light flashes of substantially instantaneous duration and of high intensity, transmitting light emitted by such flashes in a desired direction while predeterminedly modifying the same, whereby to transmit light signals in selected channels of communication, and receiving the light flashes transmitted in each channel of communication in an individual receiving channel and converting received light signal into electrical energy for effecting the actuation of an electrical utilization circuit; and in a method of the character described, to provide for coding the light signals by varying their physical characteristics, such as their shape, polarization, intensity or time period of duration, as well as for coding by varying the time between the generation of light flashes, and also in such a method to provide for receiving light flashes of different light characteristics, such as wavelength and/or polarization, and converting the received light flashes into signals in the form of electrical energy in accordance with wavelengths and/or polarization of the light signals, amplifying the electrical energy pulses and interpreting the energy pulses in accordance with their shape, intensity, and time period of duration whereby to control the delivery of the pulses to an electrical utilization circuit.

Other objects of the present invention are to provide a signaling system of the type described above having improved security and jam-free characteristics wherein light flashes of substantially instantaneous duration are used for signaling and means are provided for predeterminedly changing a characteristic of the light flashes, such as their polarization, so as to make the light flashes unintelligible to an unauthorized receiver; and to provide a receiver having means synchronized with corresponding means in a transmitter which will enable it to receive light flashes predeterminedly altered so as to utilize said flashes in a utilization circuit; and to provide a transmitter which can predeterminedly emit meaningless flashes of light of a character which will not affect an authorized receiver but will affect an unauthorized receiver whereby a garbling of the message will be accomplished.

Another object of the present invention is to provide a transmitter for emitting substantially instantaneous discrete flashes of light, a characteristic of which is modulated in accordance with audio signals, whereby an audio frequency channel of communication is provided; and to increase the security of an audio frequency transmitter using modulated discrete pulses of light by providing means in said transmitter for further modulating said flashes of light in a predetermined manner.

With these and other objects in view, the invention comprises the apparatus possessing the construction, combination of elements and arrangement of parts and the method comprising the several steps and the relation of one or more of such steps with respect to each of the others which are exemplified in the construction and method hereinafter described, and the scope of the application of which will be indicated in the claims.

The above and other objects and novel features of this invention will more fully appear from the following detailed description when the same is read in connection with accompanying drawings. It is to be expressly understood, however, that the drawings are for the purposes of illustration only and are not intended as a definition of the limits of the invention, reference being primarily had for this latter purpose to the appended claims.

For a fuller understanding of this invention, reference should be had to the accompanying drawings, in which.

Light flashes such as those generated on the discharge or firing of a flash lamp or tube of a gaseous discharge type used in the present invention have an intensity which is considerably greater than sunlight. Flashes produced by such lamps are substantially instantaneous and may have a time period of duration of the order of from $1/20,000$ to $1/1,000,000$ of a second. The unique characteristics of flashes produced by such gaseous discharge devices are advantageous in signaling in that the instantaneous duration of the flashes permits a sharp cutoff between successive signals with consequently easy differentiation therebetween while the high intensity of the flashes permits transmission of signals for relatively long space distances even under adverse lighting conditions that is to say, in strong sunlight.

In providing a signaling system wherein signals, information, orders and the like are transmitted by light flashes of high intensity and of substantially instantaneous duration to a receiver, use is made of a transmitter which directs light emitted on the discharge of one or more gaseous-discharge devices to a receiver which is spaced from the transmitter and which converts the light flashes received thereby to electrical pulses adapted to be selectively delivered to a utilization circuit. A signaling system of such character is adapted for use with transmitting and receiving stations which may be stationary or movable. Such systems are particularly useful in effecting the direction of a moving object which carries a receiving station. In such instances, the moving object may be directed from a moving or a stationary transmitting station. In addition, systems of this type are useful in transmitting code or message-bearing signals from a moving or stationary transmitting station to a moving or stationary receiving station. They may also be used in transmitting audio signals, such as speech.

The principles involved in providing a signaling system of the character forming the subject matter of the invention are schematically illustrated in the block diagrams which form Figs. 1 through 5. Briefly, these principles involve the use of an optical switch for directing light, emitted by one or more gaseous discharge devices, to a receiver adapted to convert light transmitted thereto by the transmitter into electric pulses which, after amplification, are delivered to an electrical utilization circuit to effect the actuation thereof. These principles, as will presently appear, may be used in conjunction with a variety of specific electrical circuits, several specific circuits being hereinafter described in detail.

Figure 1:
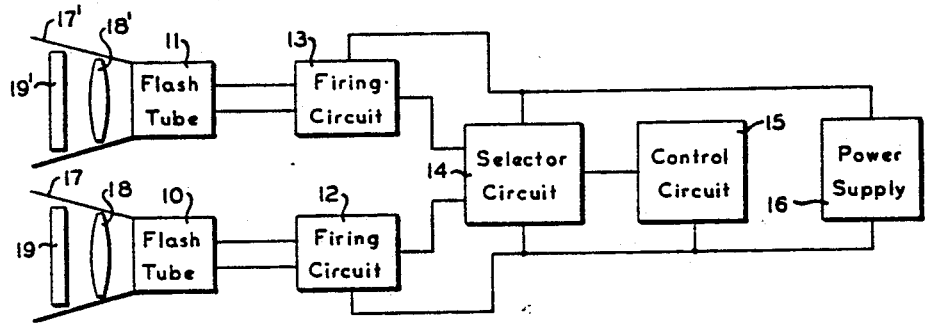
Figure 1 is a schematic block diagram of a transmitter embodying one feature of the present invention.

Turning now to Fig. 1, there are shown two flash lamps or tubes 10 and 11 of the type described in the patent to H. E. Edgerton, 2,351,603, June 20, 1944, and the patent to Germeshausen, 2,277,698, March 31, 1942. Since this type of flash lamp is well known in the prior art, a detailed description thereof is not considered necessary. In general, however, this flash lamp is a very high-resistance, gaseous discharge tube, which, when ionized by an induction current, breaks down to an extremely low resistance, thereby allowing the passage of an extremely large current therethrough, and thus permitting practically instantaneous discharge of a high voltage condenser therethrough. A preferred type of tube is that produced by the General Electric Company under the designation "FT 19."

To control these flash lamps or tubes, there are provided firing circuits 12 and 13. These circuits, which are similar to those shown in the Edgerton patent mentioned above, comprise means for applying high voltages to the flash tubes and also means for ionizing the flash tubes to cause discharge of the high voltage therethrough. As can be seen from Fig. 1, firing circuit 12 controls flash tube 10, while firing circuit 13 controls flash tube 11. There is also provided a selector circuit 14 which will trigger either the firing circuit 12 or the firing circuit 13, in accordance with a predetermined signal from a control circuit 15. The control circuit may be of any suitable type, such as a standard telegraph key, teletypewriter, or a miniature control stick of an aircraft, adapted to close a number of predeterminedly spaced switches. Numerous other types of control circuits are contemplated by the present invention and will be apparent to those skilled in the art.

There is also a suitable power supply 16 which will give suitable energization to the various circuits and tubes employed in the present invention. For guiding the emission of light from the flash tube 10, there is shown a flanged reflector 17, a lens 18, and a polarizing filter 19. This is a preferred system of communication, since the light is concentrated in a predetermined path. The polarizing filter 19 is preferably an infrared filter and may be either a plane polarizing or circular polarizing filter. A similar optical system is provided for the flash tube 11, wherein the reflector 17', the lens 18' and an infrared polarizing filter 19' are provided. In this case, it is preferred that the polarizing filter 19' be of an opposite sense from the polarizing filter 19—in other words, one may be a plane polarizing filter and the other may be a circular polarizing filter, or both may be plane polarizing filters, one being adapted to polarize in a vertical plane, while the other is adapted to polarize in a horizontal plane. It is also possible, and in some cases desirable, for one filter to be infrared while the other filter is ultraviolet. The reason for preferring to use infrared or ultraviolet filters is that the light passed by such filters is invisible to the eye.

It is apparent that the specific type of optical system shown is subject to many variations. For instance, light may be emitted through 360° by the use of a proper lens system, and it is equally possible to practice the present invention by the elimination of all optical systems and filters. It is preferred, however, to have light of distinct characteristics emitted from each of the two flash lamps, so that light reaching a receiver from one flash lamp may be distinguished by the receiver from light reaching that receiver from the other flash lamp. There will thus be formed two separate channels of communication.

It is also possible to practice the present invention by the use of just one flash tube. This feature of the invention will be discussed in more detail in connection with the discussion of the receiver circuit shown in Fig. 3.

Figure 2A:
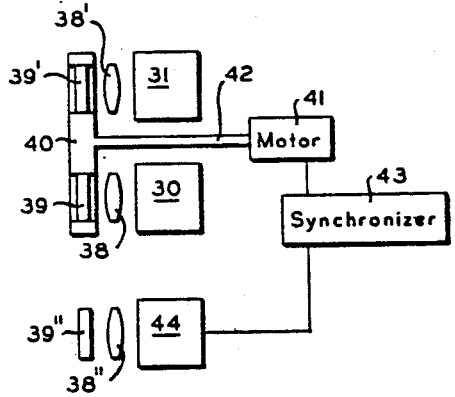
Fig. 2a is a modification of the invention shown in Fig. 2.
Figure 2:
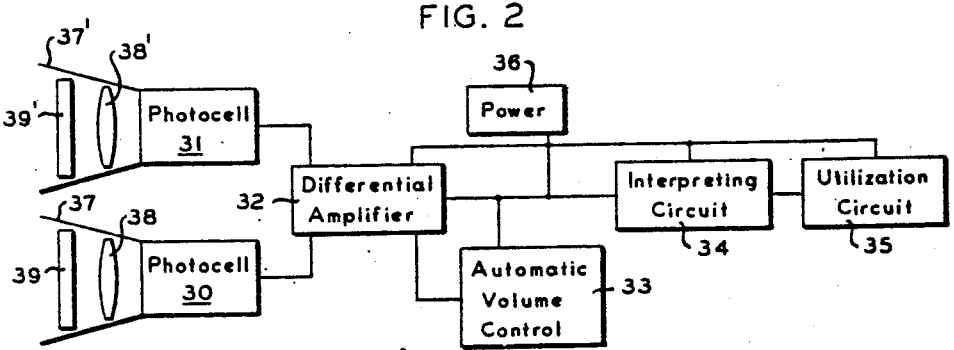
Fig. 2 is a schematic block diagram of a receiver embodying one feature of the present invention.

Turning now to a discussion of Fig. 2, there is shown a receiver adapted to operate with the transmitter of Fig. 1. As shown in Fig. 2, there are provided two photosensitive devices 30 and 31. These devices may be either of the photoemissive type, the photovoltaic type, or the photoconductive type. In a preferred modification of the invention, the photosensitive devices are of the photoemissive type and are infrared sensitive photocells made by the Farnsworth Radio and Television Company. The output of these two photocells is fed into a differential amplifier 32, which will amplify a difference in the signals generated by the two photocells. If the signals are the same, however, there will be no amplification. The output of the differential amplifier is fed to an automatic volume control 33 and also an interpreting circuit 34. The automatic volume control may be of the standard type and is used for adjusting the level of amplification to the point where shot noise and other noise generated within the photocells and the amplifier circuit will not operate the interpreting circuit. This automatic volume control automatically compensates between the allowable amplification level for day and night use, it being apparent that there will be much more random noise generated in the photocells during bright daylight use than would be generated at night during the darkness.

The interpreting circuit 34 is adapted to interpret the signals fed to it by the differential amplifier. This circuit may be responsive to the intensity of the signals, the pulse repetition frequency of the signals, the pulse length of the signals or any other variation normally used for various code transmissions. It will, of course, be obvious that the interpreting circuit must be designed for the particular type of signals sent out by the transmitter. In one modification of the present invention, it is contemplated to have the interpreting circuit operate on signal spacing constituting dots and dashes of the Morse code. In another modification of the invention, the signals fed to the interpreting circuit are spaced in such a way as to be changed by the interpreting circuit to signals for use with a teletypewriter. In another modification of the invention, the signals fed to the interpreting circuit are for the use of controlling the flight of a guided missile.

The utilization circuit 35 may be of any kind, such as a loud speaker or head phones for use with audio signals or Morse code. It may be the aileron and rudder controls of a guided missile or it might be a teletypewriter.

The photocell 30 has an optical system associated therewith comprising a reflector 37, a lens 38 and a polarizing filter 39; and the photocell 31 has a similar reflector 37', lens 38' and polarizing filter 39'. A suitable power supply 36 is provided for energizing the various circuits.

In order to understand the operation of Figs. 1 and 2, it is preferable to consider their operation together with one simplified type of signal. If in Fig. 1, it is desired to transmit a code composed of two characters such as the dot and dash of the Morse code or the mark and space pulses of a teletypewriter, the flash tube filter 19 may be a vertically polarizing infrared filter, and the filter 19' may be horizontally polarizing infrared filter. A normally open switch having two pairs of independently actuated opposed contacts may be employed to control the selector circuit 14 to energize either the firing circuit 12 or the firing circuit 13, depending upon which pair of contacts of the switch is closed. For the purposes of illustration, it will be assumed that actuation of the firing circuit 12 corresponds to a dot in Morse code, while the actuation of the firing circuit 13 corresponds to a dash. When the switch is operated in a direction to close the "dot" contacts, the firing circuit 12 is actuated. This fires the flash tube 10 which emits from the polarized filter 19 a vertically polarized infrared flash of light. The filter 39 associated with the photocell 30 in Fig. 2 may be a vertically polarizing infrared filter and the filter 39' associated with the photocell 31 may be a horizontally polarizing infrared filter. When the vertically polarized infrared flash of light reaches the receiver, it has no effect upon the photocell 31, since it is blocked by the horizontally polarizing filter 39'. It does, however, pass through the filter 39 and reach the photocell 30. This causes a very definite unbalance between the outputs of the two photocells and the differential amplifier therefore amplifies the signal received and generated by the photocell 30. Since this signal is in the form of a very sharp pulse, the automatic volume control has no effect upon the gain of the amplifier during the time that this signal is being amplified, and the signal is greatly amplified and fed to the interpreting circuit 34. Assume that the amplifier feeds a negative pulse to the interpreting circuit 34 and that the interpreting circuit is designed to produce a dot when it is energized by a negative signal. This dot is then fed to the utilization circuit 35, which in this case may be a light bulb or a pair of head phones. The dot is then reproduced by either audio or visual means.

Returning now to Fig. 1, assume that the normally open switch previously mentioned is placed in the dash position. This energizes the selector circuit 14 in such a way that it triggers the firing circuit 13. The triggering of the firing circuit 13 causes the flash tube 11 to fire and a pulse of horizontally polarized infrared light is transmitted through the filter 19'. When this flash of light reaches the receiver of Fig. 2, it is rejected by the polarizing filter 39 but passes through the polarizing filter 39' and causes an energization of photocell 31. This unbalances the circuits so that the differential amplifier produces a positive pulse. As in the case of the negative pulse discussed above, the automatic volume control has no effect upon the particular signal being amplified, and this amplified positive pulse is fed to the interpreting circuit 34. The interpreting circuit, which is designed to generate a dash upon the receipt of a positive pulse, so generates a dash, which is fed to the earphones in the utilization circuit 35.

It should be noted in connection with Fig. 2 that by the arrangement of the circuit shown therein, there is produced a receiver which is quite insensitive to the influence of light coming from sources other than either of the flash tubes of Fig. 1. This is due to two features of the receiver circuit: The first is that the output of the two photocells 30 and 31 is fed into a differential amplifier which amplifies only the difference between these two outputs. Light striking these two photocells in the same intensity does not allow the amplifier to operate and pass a signal to the interpreting circuit. Thus, if a bright flash of sunlight, for instance, hits the photocells 30 and 31, it energizes both photocells equally, since sunlight is polarized in all directions and is passed in the same amounts by the two filters 39 and 39'. The same applies to any other unpolarized light striking the two photocells. The second feature of the circuit which prevents its response to other than light signals from the flash tubes is the automatic volume control. As pointed out previously, this automatic volume control has a short enough time delay so that it will prevent the amplification of light which changes in intensity comparatively rapidly. A time delay of 1/50 of a second is sufficiently short for most purposes. Since the time delay of 1/50 of a second has no effect upon a light flash of a total duration of the order of between 500 and 1 microseconds, a light flash from the flash tubes is not affected by the automatic volume control and the differential amplifier is allowed to amplify these short pulses. The differential amplifier may, however, have some effect on a following signal and may lower the average peak voltage of a following signal, although it will not prevent amplification thereof.

The above discussion of the operation of the transmitter and receiver shown in Figs. 1 and 2, respectively, involves one of the simplest modifications of the present invention, and the detailed circuits necessary to accomplish the operation as described above will not be shown, since it is felt that the means for accomplishing the desired result will be readily apparent from a discussion of the more complicated circuits which will be described in detail later.

Figure 1A:
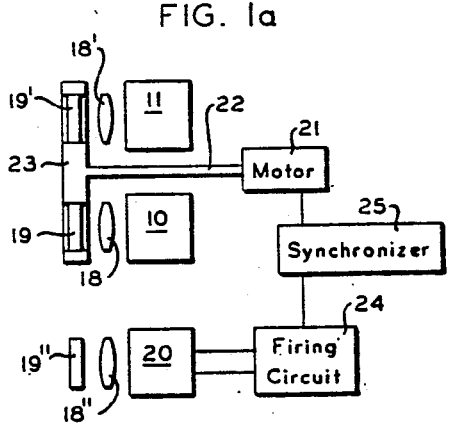
Fig. 1a is a modification of the invention shown in Fig. 1.

In Fig. 1a there is shown a somewhat modified optical system, wherein flash tubes 10 and 11 are employed as in Fig. 1. These flash tubes have lenses 18 and 18' and polarizing filters 19 and 19'. It should be noted, however, that the filters 19 and 19' are mounted upon a rotary disc 23, driven by a shaft 22 from a motor 21. Thus, the polarization and type of light emitted from flash tube 10, for instance, is continuously changed. At one flash, it might be infrared light vertically polarized, and at the next flash it might be ultraviolet light circularly polarized. There is also shown an additional flash tube 20, having a lens 18" and a filter 19" similar to lens 18 and filter 19. The flash tube 20 is controlled by a firing circuit 24 which is, in turn, controlled by a synchronizing circuit 25. The flash tube 20 can be used to synchronize a motor 41 driving a rotary disc 40 shown in Fig. 2a, in which case the synchronizing circuit 25 controls the firing of the flash tube 20 so as to permit synchronization between the two motors. As will be readily understood by those skilled in the art, motor 21 may be a constant speed motor which controls the synchronizing circuit, or the synchronizing circuit may control the speed of the motor.

It is also possible to utilize the flash tube 20 as a garbling flash tube, in order to make the interception of messages more difficult. If this be the case, it may be desirable to have the flash tube 20 emit only unpolarized light, in which case the filter 19'' can be only an infrared filter and does not polarize the light in any predetermined manner, but allows unpolarized light to pass therethrough. If the flash tube 20 is used only for garbling, it may be fired independently of the operation of the synchronous motor in either a random or predetermined manner. It is also apparent that the garbling flash tube 20 can be used with the transmitter circuit of Fig. 1 where no rotary filters are used.

Fig. 2a shows a receiving circuit adapted to be used with a transmitter circuit of the type described above in connection with Fig. 1a. As shown, there has been added to the circuit of Fig. 2 a rotating disc 40, driven by a motor 41 through a shaft 42. There is a synchronizing circuit 43 and a photocell 44. This photocell 44 is adapted to have its output fed to the synchronizing circuit 43, which, in turn, controls the speed of rotation of motor 41 and also its angular position at any instant of time, so as to keep motor 41 in synchronism with the motor 21 of Fig. 1a. The rotating disc 40 carries polarizing filters 39 and 39'' which are adapted to be placed in front of the respective photocells as the disc rotates. The filter 39'' is a polarizing filter of the same kind as the polarizing filter 19''.

Turning now to a discussion of the operation of Fig. 1a and Fig. 2a, it can be seen that there are certain advantages in the optical system as shown. If, at any one instant, the flash tube 10 is fired, it produces a flash of light corresponding to the type of filter 19 positioned in front thereof at the time of the flash. Since a filter of the same type is in front of the corresponding photocell 30 in the receiver, the firing of the flash tube 10 energizes the photocell 30 in the receiver. The same is true of the firing of the flash tube 11, since the filter in front thereof at any instant of time, corresponds to the filter in front of the photocell 31. Since the transmission of light between the transmitter and the receiver is of a negligible time, no special precautions are necessary in the synchronization of the rotating filters carried on the disc 23. Whenever the flash tube 20 is fired, it generates a pulse of light having a color and polarization depending upon the type of filter 19'' used. If this flash of light is used to synchronize the receiver motor 40, it may be advantageous to have the filter 19'' polarized in a manner unlike any of the filters 19 or 19' carried by the rotating disc 23.

It is advantageous to use the circular disc 23 carrying the filters 19 and 19' in some cases, since it makes the system less susceptible to jamming by the enemy if the system is used in war time, since it is apparent that continually changing types of polarization used would be extremely difficult to duplicate so as to effectually hinder communications. For instance, the disc 23 may carry four infrared filters polarized differently, four green filters polarized differently, and four blue filters polarized differently. Anyone attempting to jam the system would have to send a signal of the proper color, and of the proper polarization and at the proper time to energize flash tubes 30 or 31. With the system mentioned above, there are 12 combinations and, at any instant of time, only two of the 12 are effective to energize either of the photocells in the receiver. It is, of course, apparent that even more combinations may be employed which would make jamming even more difficult. This is particularly true where more photocells are employed and the circuit is designed so that a specified two of the photocells must be energized at any instant in order to operate the interpreting circuit.

It is also possible, as explained above, to utilize the flash tube 20 for the purpose of garbling the signals. In this case, it might be desirable to have the filter 19'' nonpolarizing. If this be the case, it would be extremely difficult for anyone not authorized to receive the signals transmitted by flash tubes 10 and 11 to distinguish from the flashes produced by tubes 10, 11 and 20.

It is equally possible to have the individual filters rotating around their optical axes as well as around the axis of the disc carrying the filters, thus giving the filters a planetary motion.

In order to use one photocell in the transmitter and receiver, instead of two, the circuits of Figs. 1 and 2 can be slightly modified. As a means of doing this, the firing circuit 13 and the flash tube 11 are omitted from the transmitter of Fig. 1 and the receiver is modified as shown in Fig. 3.

Figure 3:
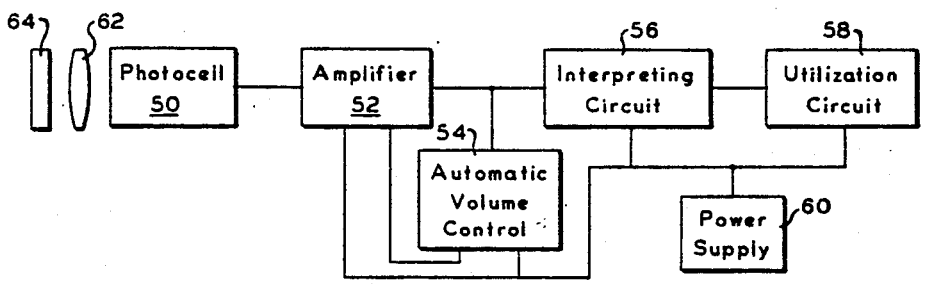
Fig. 3 is a schematic block diagram of another modification of a receiver embodying the present invention.

In Fig. 3 there is provided a photocell 50 preferably of the photoemissive type, an amplifier 52 which can be a high-gain amplifier, and an automatic volume control 54. The automatic volume control is preferably adjusted to prevent the amplifier from amplifying any noise generated either in the photocell or the amplifier circuit itself, and it has a sufficiently fast time circuit so as to prevent a signal from passing through the amplifier upon comparatively rapid changes in the intensity of the light striking photocell 50, such as would be caused by changes in the intensity of light on a partially cloudy day or when the receiver was swung from a position away from the sun to a position pointing generally towards the sun. The automatic volume control, however, has a sufficiently slow response so that it does not prevent the amplification of a substantially instantaneous signal such as is generated by the flash tube 10 of Fig. 1, although it may lower the average peak voltage of a following signal. The output of amplifier 52 is fed into an interpreting circuit 56 which may be a standard counter circuit or other decoding circuit. As an example, it may have such an arrangement of parts that one single pulse spaced in time from any other pulses will operate a certain tube to close a relay, while a number of pulses spaced close together energize the tube to maintain the relay closed for the whole group of closely spaced pulses. Since this general type of circuit is well known in the art, a detailed discussion thereof will not be included here. It is only necessary for the relay to have a time lag for opening greater than the spacing between the pulses constituting a dash signal. The output of the interpreting circuit 56 is fed to the utilization circuit 58 which may be earphones or a teletypewriter or any other suitable apparatus for utilizing electrical energy. It is obvious that many types of interpreting circuits can be utilized, some operating upon the pulse length, others upon the pulse intensity, or others on the pulse shape. For the purpose of explaining the present invention, however, the interpreting circuit will be considered as operating upon the delay-relay principle.

One of the simplest modifications of a Morse code transmitter is one where the selector circuit 14 of Fig. 1 triggers the firing circuit 12 at rapid intervals when energized by the control circuit. The flashing interval of the firing circuit 12 may be made approximately equal to the length of a dot in Morse code, and such a firing circuit may be conveniently controlled by means of an automatic telegraph key of the type well-known in the art. An automatic telegraph key comprises a horizontal operating handle pivoted about a vertical axis and operating two sets of normally open contacts. The first set of contacts consists of a fixed contact and a cooperating oscillatory contact carried on a weighted resilient arm which acts as a pendulum when the operating handle is moved to a dot position and causes the contacts associated therewith to close for a short interval during each oscillation of the resilient arm, thus producing a series of dots. The second set of contacts are connected in parallel with the first set and consist of a fixed contact and a movable contact carried by the operating handle which mates with the fixed contact when the operating handle is moved to the "dash" position. Thus the automatic key automatically sends a series of dots when the handle is moved in one direction and a continuous dash when the handle is moved in the other direction. The semi-automatic telegraph key in the present application is operated in opposite to normal fashion, since the normal "dot" contacts are employed to transmit a dash and the normal "dash" contacts are used to transmit a dot. Thus, the flash tube 10, for a dot, emits only one flash, while for a dash it emits a series of flashes spaced very close together. When the photocell 50 receives a single flash, the amplifier 52 feeds a single pulse to the interpreting circuit. If a dash is received by the photocell 50, the amplifier 52 feeds a number of pulses to the interpreting circuit 56, and the delay relay stays closed for a longer time, thus reproducing dots or dashes in the utilization circuit 58.

In the above discussion of Figs. 1 and 2, the discussion of the invention has been limited to the use of two flash tubes and two photocells for forming separate channels of communication. It is, of course, apparent that more photocells and more flash tubes can be used to increase the number of channels, and combinations of various types of light can be utilized for different purposes. For instance, four flash tubes can be used in the transmitter with four different polarizing filters, and four photocells can be used with four corresponding filters in the receiver. These filters can all be of one color and one of them vertically polarizing, another horizontally polarizing, a third circularly polarizing clockwise, and the fourth circularly polarizing counterclockwise. It is possible to add four more flash tubes and four more photocells polarizing as above, but having a color different than that used in the first set of polarizers. The receiving circuit can also be made so that it is selective to either one photocell being energized or various pairs of photocells being energized. Thus, the channels of communication can be expanded almost indefinitely. It is not felt necessary to describe in detail all of the various circuits necessary to utilize and effectuate such expanded communication channels, since it is believed that the detailed discussions of the circuits used with the present invention will make the modification thereof apparent to those skilled in the art.

It is also possible to increase the freedom from jamming by making the interpreting circuit sensitive only to signals having predetermined shapes, spacing, amplitude, pulse repetition frequency, length, or other physical characteristics. All such modifications are within the scope of the present application and would be readily apparent to one skilled in the art.

Figure 4:
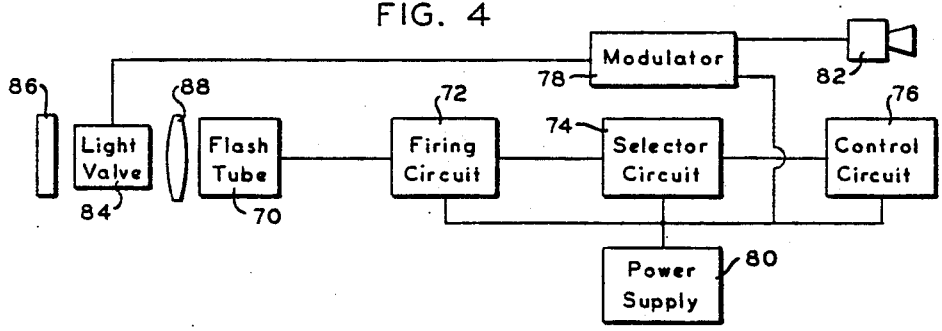
Fig. 4 is a schematic block diagram of a transmitter adapted to transmit audio-frequency modulated signals in accordance with the present invention.

Fig. 4 is a schematic diagram of another modification of the invention which contemplates the use of the present invention for transmitting audio signals and where discrete light pulses are utilized as a modulated carrier. As shown in Fig. 4 there is provided a flash tube 70 of the type previously discussed above. There is also shown a firing circuit 72, a selector circuit 74, and a control circuit 76, similar to those described in connection with Figs. 1 and 2 above. There is also provided a modulator 78 adapted to control a light valve 84. A power supply 80 is utilized for energizing the various circuits mentioned above. As can be seen in Fig. 4, there is provided a lens 88, adapted to focus the light emanating from the flash tube 70 through the light valve 84, then through a polarizing filter 86. This filter 86 can be any of the types discussed above. In order to control the modulator, there is provided an audio-frequency responsive device such as a microphone 82.

The light valve 84 may be a mechanical shutter or mirror which will control the amount of light passing therethrough. A preferred form of light valve, however, is one which will change the polarization of the light passing therethrough so that the shifting polarization will change the amount of light which is passed by the polarizing filter 86, and of the devices utilized for changing the polarization a Kerr call is a preferred type due to the fact that it may be operated without any problems of mechanical inertia.

In the operation of the circuit of Fig. 4, the control circuit 76 will energize the selector circuit 74 which may be, for instance, a 20,000 cycle per second oscillator. When energized, the selector circuit feeds 20,000 triggering pulses per second to the firing circuit 72. This causes the flash tube 70 to fire 20,000 times per second, and 20,000 light flashes of a predetermined intensity reach the light valve every second. These 20,000 flashes per second constitute a sort of carrier frequency which can be amplitude-modulated by the operation of the light valve. This amplitude modulation is controlled by the modulator, which, in turn, is actuated by means such as the microphone 82. As audio signals reach the microphone 82 they are converted into electrical signals and are fed into the modulator 78, where they operate the modulator to control the light valve 84. Thus, at any instant of time, the instantaneous intensity of a light flash passing through the light valve 84 corresponds to the instantaneous intensity of an audio signal reaching the microphone 82. There is consequently produced a series of discrete flashes of light, the intensity of each flash varying in accordance with an amplitude-modulated envelope, corresponding to the audio signals reaching the microphone 82. In order to receive and interpret these signals, a circuit of the type shown in Fig. 3 can be used. In this case, the light filter 64 of Fig. 3 is made to correspond with the light filter 86 of Fig. 4.

It is also contemplated to modify the circuit of Fig. 4 so that the light transmitted therefrom will consist of a number of pulses of substantially the same intensity. The advantage of this system is that it is most difficult for a person not authorized to receive these light signals to intercept them and interpret them. This is accomplished by making the filter 86 of Fig. 4 non-polarizing or by omitting it entirely. It is preferred, however, to have the filter 86 an infrared filter. In this case, all of the other elements of the circuit are the same and it can be seen that the light valve 84 which is preferably a Kerr cell shifts the polarization of the light passing therethrough in accordance with the intensity of the audio signals reaching the microphone 82. Since this shift in polarization does not affect the intensity of the light signals, they may all appear to be of the same intensity. When signals of this type, i. e., of the shifting polarization, reach a receiver of the type shown in Fig. 3, they are blocked or passed by the polarized filter 64 of Fig. 3, in accordance with their polarization. Thus, the polarizing filter 64 of the receiver acts as the second half of the light valve. The light striking the photocell 50 of Fig. 3 varies in accordance with the amplitude variations of the audio frequency reaching the microphone 82 in Fig. 4.

In order to improve even further the security of these light signals from interception, it is possible to mount the Kerr cell 84 of Fig. 4 so that it may be continuously or intermittently rotated. Thus, if it is continuously rotated, the plane of polarization thereof is likewise continuously rotated and the modulating rotation is superimposed upon this rotation. If the filter 86 in Fig. 4 is a polarizing filter, it is preferred to rotate this filter in synchronism with the rotation of the Kerr cell 84. If the filter 86 is not a polarizing filter, it is, of course, not necessary to rotate it. In order to receive messages transmitted by a system of the type shown in Fig. 4, where the Kerr cell is rotated continuously and the modulation of the signals is accomplished by further rotation of the plane of polarization, it is necessary to have the polarizing filter 64 of Fig. 3 rotate in synchronism therewith. Any suitable means can be utilized for synchronizing rotation of the filter 64 of Fig. 3 with the rotation of the Kerr cell 84 in Fig. 4. Such a means is shown schematically in Figs. 1a and 2a above.

It is apparent that the relationship between the plane of polarization of the Kerr cell and the necessary polarizing filter, that is either filter 86 of Fig. 4 or filter 64 of Fig. 3, can be of either of two types. The normal plane of polarization of the Kerr cell may be at right angles to the plane of polarization of the filter or it can be parallel thereto. In the first case, when no signal is applied to the Kerr cell, the filter passes a minimum of light. When a maximum signal is applied to the Kerr cell, the plane of polarization of light transmitted therethrough is rotated a maximum and the filter passes a maximum amount of light. In the second situation, when no signal is applied to the Kerr cell, the plane of polarization is such that the filter passes a maximum of light. When the amplitude of the signal applied to the Kerr cell is a maximum, the filter passes a minimum of light.

As mentioned above, it is preferred to use a Kerr cell for changing the polarization of the light passing therethrough. It is possible, however, to use a polarizing sheet of the type known by the trade name "Polaroid" mounted in a movable frame. In this case, the polarizing axis of the polarized sheet is rotated in accordance with the amplitude of the modulating signals, applied to a rotating means such as a solenoid. As stated above, however, the problems of mechanical inertia make the use of a Kerr cell preferable to this last-described means.

Figure 5:
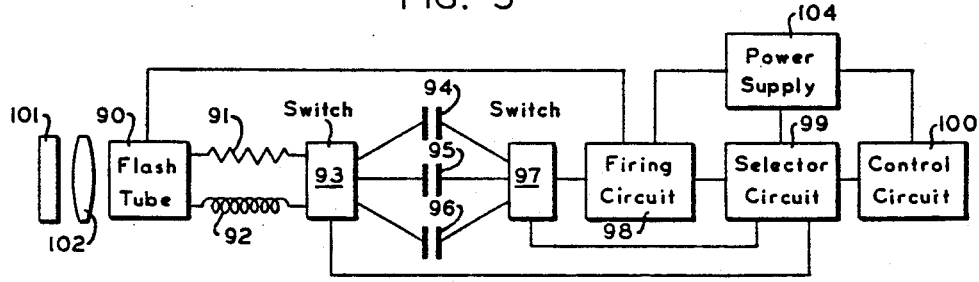
Fig. 5 is a schematic block diagram of a further modification of a transmitter which may be used in the present invention.

In Fig. 5 there is shown a schematic diagram of another modification of the present invention. There is provided a flash tube 90 of the type described above, which is connected to a switch 93 by a resistance 91 and an inductance 92 connected in parallel. Between the switch 93 and the switch 97 there are three condensers 94, 95, and 96, connected in parallel. Connected to the switch 97 there is a firing circuit 98. Energizing the firing circuit, there is provided a selector circuit 99 which is controlled by the control circuit 100. A suitable power supply 104 is provided for the various circuits mentioned above. There is also included a filter 101 and a lens 102, which may be of the type discussed in connection with the previous figures. As can be seen, the selector circuit is connected to switches 93 and 97 so as to control the operation thereof. In the use of the transmitter described in Fig. 5, the control circuit 100 energizes the selector circuit 99 in a predetermined manner and the selector circuit controls, in turn, the switches 93 and 97 and also the firing circuit 98. The condensers 94, 95 and 96, each having a different capacity produce a different type of flash when discharged through the flash tube 90, and, depending upon their characteristics may give a very brilliant flash of short duration, a brilliant flash of long duration or a less brilliant flash of long or short duration. Since the resistance and inductance 91 and 92, respectively, are in series with the flash tube and condenser, they also act to modify the flash produced by the flash tube, either changing its slope, duration or intensity. The selector circuit 99 thus selects any one of the three condensers and either the resistance or inductance for firing the flash tube, and also, of course, controls the time at which the firing circuit 98 fires the flash tube. It is, of course, apparent that many other combinations may be employed for controlling the flash of the flash tube and will be apparent to those skilled in the art. For instance, with certain types of signals it might be desirable to use all three condensers in parallel for flashing the tube.

It is equally apparent that the switches 93 and 97 can be either mechanical or electronic switches depending upon the particular results which it is desired to accomplish.

Figure 6:
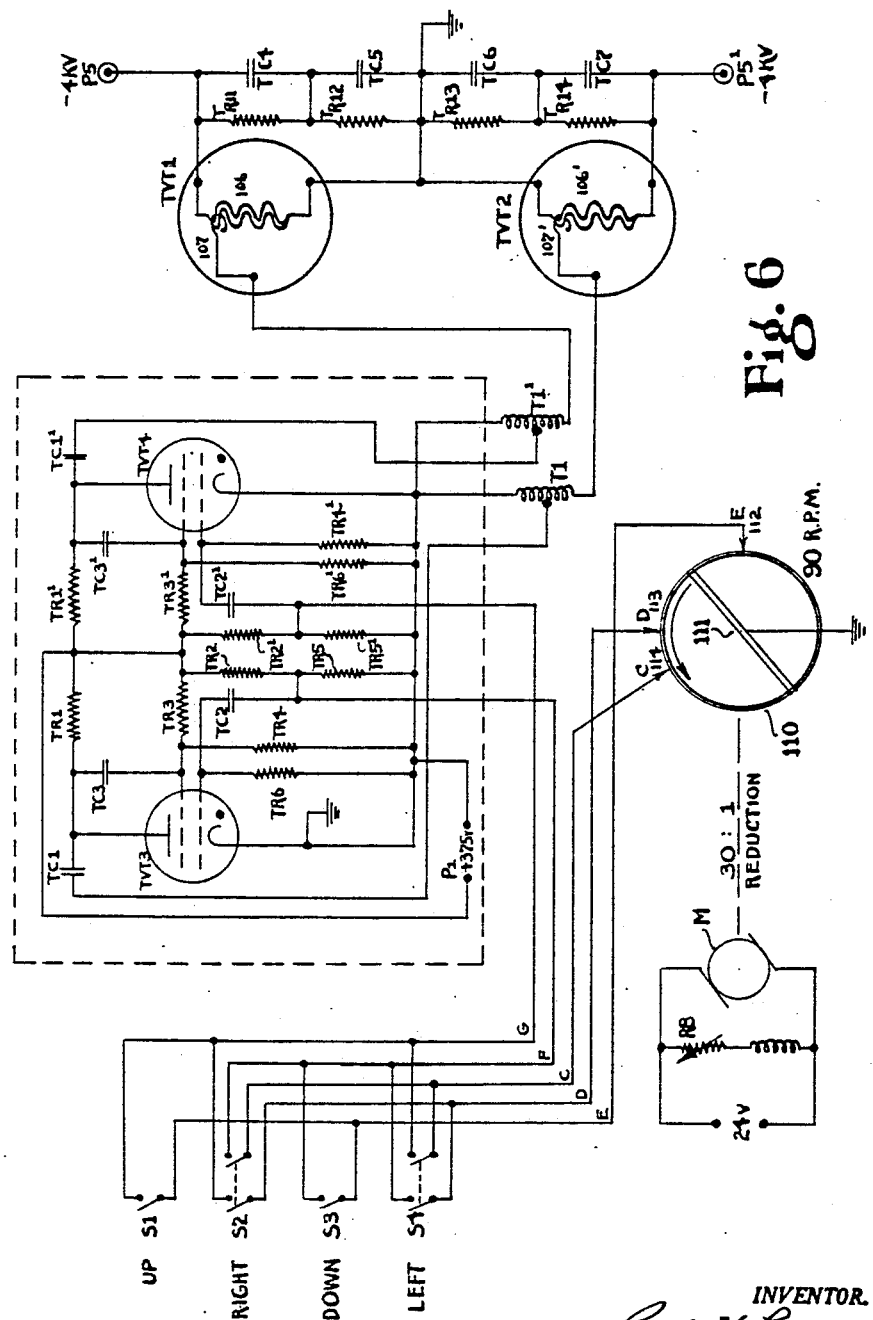
Fig. 6 is a schematic detailed circuit diagram of a transmitter adapted to transmit signals for the control of a guided missile.

Turning now to a description of a detailed embodiment of the invention, as shown in Fig. 6 there is provided a transmitter capable of producing flashes of extremely high intensity light of very short duration which may be utilized in the various signaling systems described previously. As shown in Fig. 6 there are provided two flash tubes TVT1 and TVT2. These tubes are preferably of the type known as "Edgerton flash lamps" and are quite adequately described in the above-mentioned U. S. Patents. As can be seen, each flash tube comprises a coiled, gaseous discharge space filled with rare gas. This discharge space is indicated as 106. At 107 there is provided a loop for ionizing the gas in the discharge coil 106. This coil is capacitatively coupled to the gaseous discharge chamber. In parallel with each gaseous discharge tube is a series of condensers and resistors for supplying high voltage to the tubes. In parallel with TVT1 are bleeder resistors TR11 and TR12. Also in parallel with this tube are charging condensers TC4 and TC5. A minus 4,000-volt supply is connected at P5 across the condensers and resistors so that the total charge on condenser TC4 and TC5 may build up to minus 4,000 volts. When the gas in the helical coil 106 of tube TVT1 is ionized, the condenser TC4 and TC5 will discharge therethrough, causing a brilliant flash of light to be created. The flash tube TVT2 has a similar set of bleeder resistors TR13 and TR14 and similar charging condensers TC6 and TC7. It also has a minus 4,000-volt power supply at P5'.

For firing each of these tubes there is provided a separate firing circuit. Tube TVT4 is utilized for firing flash tube TVT1, while tube TVT3 is utilized for flashing tube TVT2. Tubes TVT3 and TVT4 are of the cold cathode type employing multiple internal grid control and are capable of conducting very large currents on a light duty cycle. Such tubes are described in Patents Nos. 2,185,189 and 2,201,167 to Edgerton, Germeshausen and Grier, and are well-known to those skilled in the art. Power supply P1 furnishes approximately 375 volts to the plate circuits of TVT3 and TVT4. This 375 volts is suitably divided by resistances TR1, TR2, TR3, TR4, TR5, and TR6, so as to provide suitable voltages to the various grids of TVT3. Condensers TC2 and TC3 are also included. The circuit of tube TVT4 is identical with that just discussed in connection with tube TVT3, and the various resistors TR1', TR2', etc. correspond to their equivalent resistors in the circuit of TVT3.

In the plate circuit of tube TVT3 there is provided a condenser TC1 which is adapted to be charged while tube TVT3 is blocked. When tube TVT3 is passing current, it discharges condenser TC1, thus passing a surge of current through one half of autotransformer T1. This current flow will induce a high voltage in transformer T1, which is applied to the loop 107 in flash tube TVT2. A similar condenser TC1' is provided in plate circuit of flash tube TVT4, and it similarly, upon discharging, induces a high voltage in transformer T1' connected thereto, this high voltage having a corresponding effect on the loop 107 in flash tube TVT1. It thus can be seen that whenever tube TVT3 is made conducting, the discharge of the condenser TC1 produces a high voltage surge in the loop of flash tube TVT2. This voltage surge ionizes the gas in flash tube TVT2 and enables this tube to discharge the voltage on condensers TC6 and TC7 therethrough. Since the resistance of the gas in the flash tube TVT2 drops almost immediately to an extremely low value, upon being ionized, the discharge of the two condensers is practically instantaneous and an extremely bright flash of light is produced having a substantially instantaneous duration.

In order that tubes TVT3 and TVT4 may be made to conduct at predetermined intervals and at predetermined sequences of operation, a number of switches are provided. As can be seen, there are four switches, S1, S2, S3 and S4, corresponding respectively to a miniature control stick of an airplane. This is an illustrative modification and it is obvious that numerous other combinations of switches could be utilized. Connected with the switches are lines C, D, E, F, and G, the first three being connected to contacts 114, 113, and 112, operatively associated with commutator 110. The other two lines, F and G, are connected to tube TVT3 and tube TVT4 respectively. Commutator 110 is driven by a motor M through a 30 to 1 reduction, so as to provide for the commutator a speed of approximately 90 R. P. M. The commutator carries a shorting bar 111, adapted to engage contacts 112, 113, and 114 in sequence, it acting to reduce the potential of those contacts to ground whenever it engages those contacts. Assuming that switch S1 corresponds to an "up signal," S2 to a "right signal," S3 to a "down signal," and S4 to a "left signal," the operation of the circuit will be described: If an "up signal" is given, the switch S1 is closed. When the shorting bar 111 engages contact 112, line E is grounded. Since switch 1 is closed, line G is also reduced to ground potential, and the potential on the grid of tube TVT4 is lowered sufficiently with respect to the other grid thereof, so that the potential difference existing between the two causes an ionization of the gas in the tube and permits the tube to conduct. The condenser TC1' discharges through the tube TVT4 producing a voltage surge by means of transformer T1' in loop 107 of flash tube TVT1, thus firing the flash tube TVT1. Similarly, switch S3 causes flash tube TVT2 to operate whenever the shorting bar engages contact 112. Switch S2 causes flash tube TVT1 to fire and shortly thereafter it causes flash tube TVT2 to fire. Switch S4 causes TVT2 to fire and shortly thereafter causes flash tube TVT1 to fire. If an "up, right signal" is given, switches S1 and S2 are both closed and they cause the production of an "up" flash and the two "right" flashes.

In order that one skilled in the art may more readily construct the apparatus described in connection with Fig. 6 above, the various values for the tubes, resistors and capacitors used are enumerated below.

Tubes

| | |
|---|---|
| TVT1 | FT19 General Electric |
| TVT2 | FT19 General Electric |
| TVT3 | 631-P1 General Radio |
| TVT4 | 631-P1 General Radio |

Resistances

| | |
|---|---|
| TR1 | 20 k. ohms 1 watt |
| TR1' | 20 k. ohms 1 watt |
| TR2 | 250 k. ohms ½ watt |
| TR2' | 250 k. ohms ½ watt |
| TR3 | 75 k. ohms ½ watt |
| TR3' | 75 k. ohms ½ watt |
| TR4 | 25 k. ohms ½ watt |
| TR4' | 25 k. ohms ½ watt |
| TR5 | 250 k. ohms ½ watt |
| TR5' | 250 k. ohms ½ watt |
| TR6 | 100 k. ohms ½ watt |
| TR6' | 100 k. ohms ½ watt |
| TR11, 12, 13, 14 | 5 megohms 2 watts |

Condensers

| | |
|---|---|
| TC1 | 2 mfd. 600 v. |
| TC1' | 2 mfd. 600 v. |
| TC2 | .007 mfd. 600 v. |
| TC2' | .007 mfd. 600 v. |
| TC3 | .01 mfd. 600 v. |
| TC3' | .01 mfd. 600 v. |
| TC4, 5, 6, 7 | 25 mfd. Cornell Dubilier KGT-6250-1 |

In order that the light signals of the two flash tubes may be differentiated there may be associated with each tube a polarizing filter. Thus, one tube will transmit a substantially instantaneous flash of horizontally polarized light, while the other tube will transmit a substantially instantaneous flash of vertically polarized light. It is also preferable to include with these polarizers, filters which will pass only invisible infrared light, thus increasing the security of the signals transmitted. Such filters are preferably of the type described in the copending application of Blout and Amon, Serial No. 591,574 filed May 2, 1945, Patent No. 2,444,492, granted July 6, 1948, for Optical Filter and Method of Preparing Same.

Figure 7:
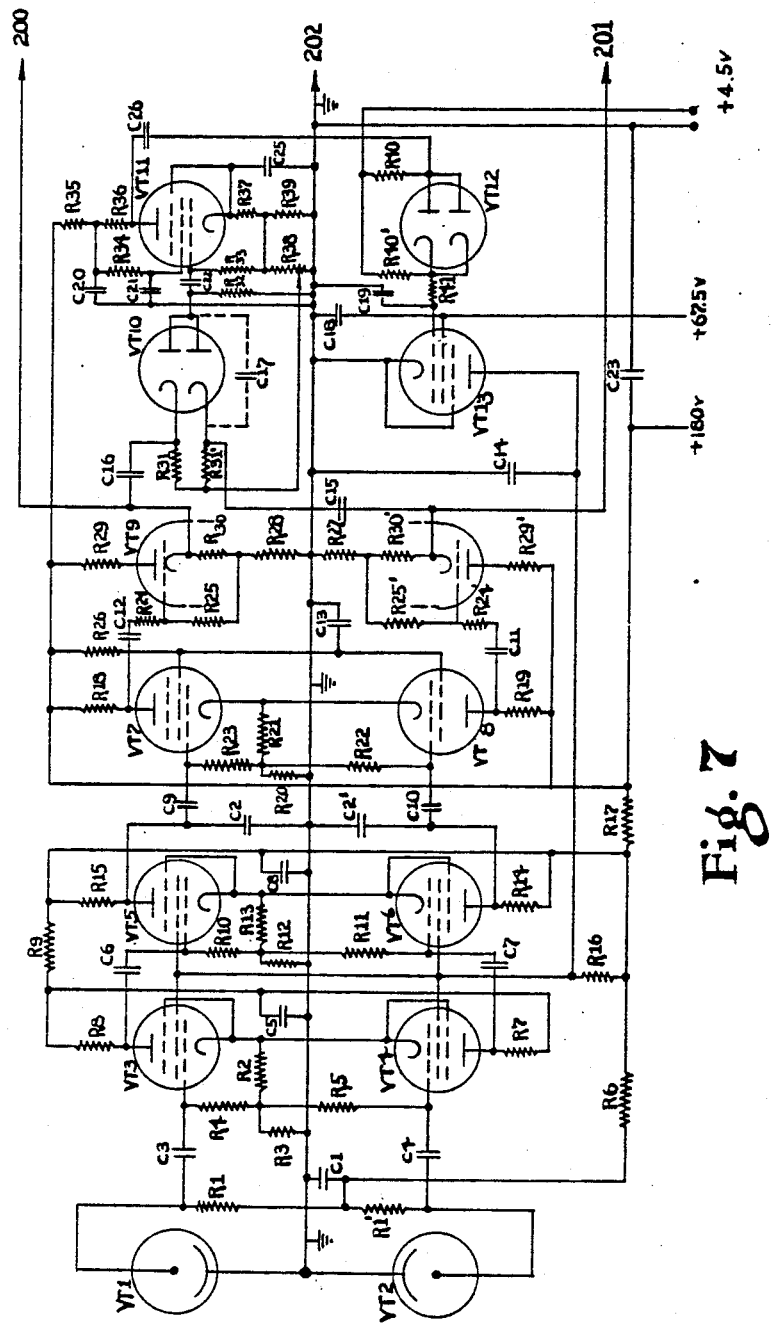
Figs. 7 and 8 are detailed circuit diagrams showing a receiver adapted to receive signals, interpret these signals, and apply them to a utilization circuit such as the control of a guided missile.
Figure 8:
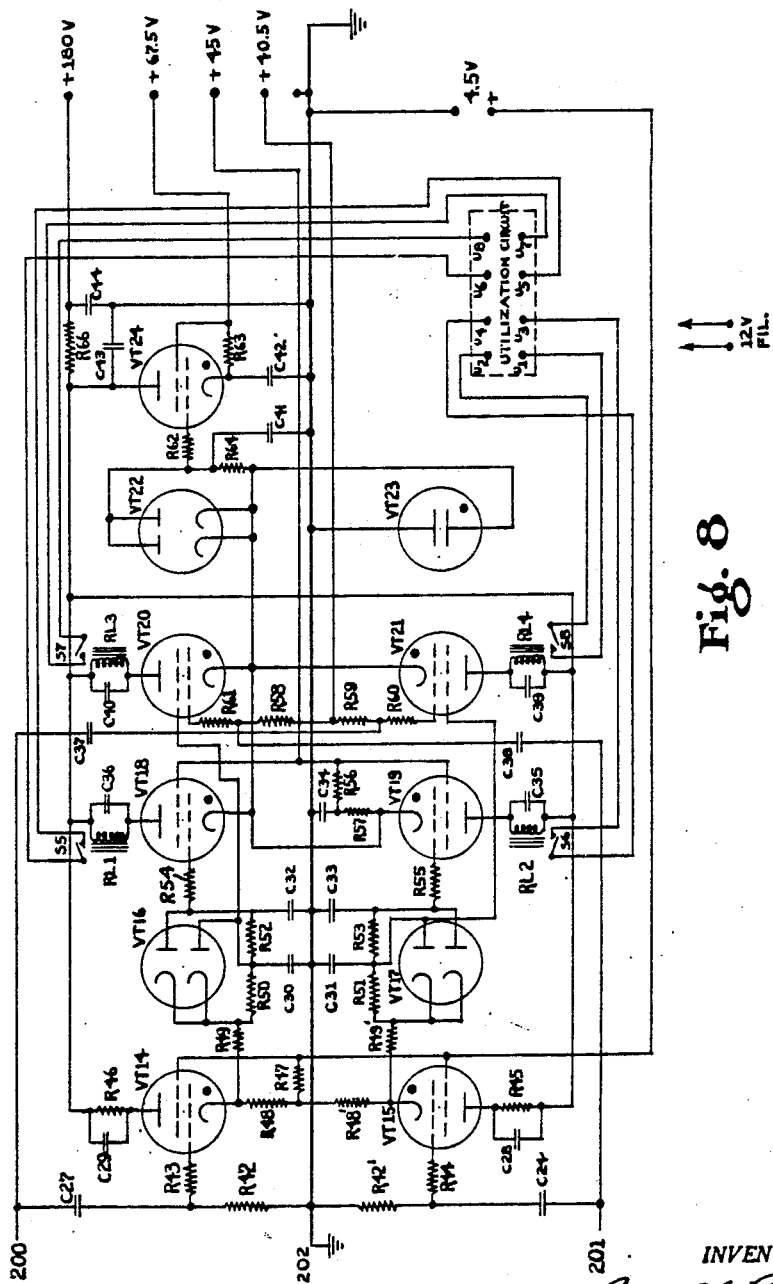

A receiver adapted to be used for signals transmitted by a transmitter of the type described in connection with Fig. 6 is shown in Figs. 7 and 8. In Fig. 7, none of the optical elements are shown, since it is believed that there is schematic representation in the previous drawings sufficient for one skilled in the art to reproduce such a receiver. In Fig. 7, there are shown schematically, two light-sensitive circuits, a differential amplifier circuit and an automatic volume control circuit. There are provided two photosensitive tubes VT1 and VT2 which are preferably very sensitive to infrared radiation. In circuit with VT1 is a load resistor R1, and in circuit with VT2 is a load resistor R1'. Condensers C3 and C4 couple the outputs of the tubes VT1 and VT2 respectively to the control grids of tubes VT3 and VT4 of the differential pre-amplifier circuit. R6, in conjunction with C1, serves as a decoupling filter for the voltage supply of VT1 and VT2. The grid at VT3 is biased by resistors R2, R3 and R4, while the grid of VT4 is biased by resistors R2, R3 and R5. In the plate circuit of VT3 is provided a load resistor R8 and in the plate circuit of VT4 there is provided a load resistor R7. In the plate voltage supply of both VT3 and VT4 there are resistors R9 and R17, in circuit with the power supply of 180 volts. Decoupling the plate voltage supply of VT3 and VT4, there is a condenser C5. Coupling the output of VT3 to the input grid of VT5 there is provide a coupling condenser C6. A similar coupling condenser C7 is provided between VT4 and VT6. The grid of VT5 is biased by resistors R10, R12 and R13 while the grid of VT6 is biased by resistors R11, R12 and R13. In the plate circuit of VT5 there is provided a load resistor R15, while in the plate circuit of VT6, there is included a load resistor R14. Decoupling the plate voltage supply of these last two tubes is a condenser C8 and resistor R17. The screen grids of VT3, VT4, VT5 and VT6 are all connected together and are provided with a resistor R16 between their common connection and the power supply. Loading the plate circuits of VT5 and VT6 are condensers C2 and C2' respectively.

For coupling the output of VT5 with VT7 there is provided a coupling condenser C9, while for coupling the output of VT6 to VT8 there is included coupling condenser C10. Resistances R20, R21, and R23 are utilized for biasing the grid of VT7 and resistances R20, R21 and R22 bias the grid of VT8. In the plate circuit of VT7 there is a load resistance R18, and in the plate circuit of VT8 there is a load resistance R19. The screen grids of VT7 and VT8 are connected together, and are decoupled from their voltage supply by condenser C13 and resistor R26. The last tube in the amplifier circuit is a double triode VT9. The output of VT7 is coupled to one grid of VT9 by the coupling condenser C12 and resistor R24. The grid of this half of the tube VT9 is biased by resistors R25, R28, and R30. The output of VT8 is fed to the other half of VT9 by coupling condenser C11 and resistance R24'. The grid of this half of tube VT9 is biased by resistors R25', R27 and R30'. In the plate circuit of the first half of VT9, there is provided a resistor R29, while in the plate circuit of the other half of VT9, there is provided a resistor R29'. The first half of VT9 is cathode coupled to the lead 200, while the second half of VT9 is cathode coupled to the lead 201. The lead 200 is also connected by coupling condenser C16 to one cathode of double diode VT10. Lead 201 is coupled through condenser C15 to the other cathode of double diode VT10. Resistors R31 and R31' are provided in the cathode circuits of VT10.

VT10 is balanced by the capacitance between two short, twisted insulated wires indicated by C17 which capacity balance the diode. The common plate connection of VT10 is connected to ground through resistance R32 and the A. C. output thereof is fed to VT11 by coupling condenser C22. The grid of VT11 is biased by resistances R33, R37, R38 and R39, and a by-passing condenser C25 is provided for R37 and R39. It should also be noted that the cathode circuit of VT10 is variably tapped into resistance R38. The screen grid of VT11 is biased by resistance R34 and is by-passed to ground by condenser C21. The plate and screen circuits of VT11 are decoupled from the power supply by resistor R35 and condenser C20. R36 is a plate load resistor for tube VT11. R34 and C21 are additional filtering elements in the screen circuit of VT11. The output of VT11 is coupled by condenser C26 to the plate circuit of double diode VT12. This tube is shunted by two resistors R40 and R40' in series and the common junction of these two resistors is connected to a power supply source of minus 4.5 volts. The cathode of VT12 is connected by resistor R41 directly to the control grid of VT13. Rapid fluctuations in voltage at this grid are smoothed out by condenser C19, R41 and C19 constituting a time circuit. The screen grid of VT13 is by-passed to ground by the condenser C18 and is directly connected to a power supply of 67.5 volts. The plate of VT13 is connected directly to the screen grids of VT3, VT4, VT5 and VT6.

In the operation of circuit described in Fig. 7, when a substantially instantaneous change in the intensity of the light reaching VT1 occurs, a signal is generated across resistance R1. This signal is impressed, by means of coupling condenser C3, on the control grid of tube VT3. Due to the arrangement in the common cathode circuit of VT3 and VT4, there is a push-pull amplification of the signal leaving the plates of VT3 and VT4. Similar action occurs in the other stages of the amplifier, and an amplified voltage is produced across resistances R30 and R28 in the cathode circuit of VT9, thus producing a signal in lead 200. At the same time, an amplified signal of opposite sign is produced across R30', and a signal of sign opposite to the signal in the lead 200 is produced in the lead 201. The average intensity of the light reaching VT1 and VT2 produces a statistical noise voltage across R1 and R1'. This noise voltage is amplified by the amplifier system and finally develops an amplified noise voltage in the cathode circuits of VT9. The noise voltage is conducted through VT10, rectified, and the A. C. component is amplified by VT11. The amplified output of VT11 is fed to peak-type rectifier VT12. The rectified output of VT12 is fed to D. C. amplifier VT13 through time circuit R41 and C19 and the conductivity of VT13 is changed with a time lag of approximately 1/60 of a second. Thus, statistical noise from the photocells produces an average voltage across resistance R16, and determines the screen grid bias on tubes VT3, VT4, VT5 and VT6. The nature of the circuit incorporating VT12 and VT13 is such that, when the statistical noise from the photocells increases, the screen grid bias on tubes VT3 through VT6 is reduced to such an extent that the peak value of the amplified noise which appears at the cathodes of VT9 is held essentially constant. The value of this nearly constant noise level at cathodes of VT9 is automatically adjusted to a value which is a little less than is necessary to cause any activity of the trigger circuits to be described later. Due to the time constant C19 and R41 the system described above does not respond rapidly enough to prevent the amplification of a signal of short duration of the type utilized with the present invention.

If equal abrupt changes occur in the intensity of the light reaching both photocells VT1 and VT2, these changes balance out in the differential amplifier circuit due to the push-pull arrangement thereof.

It can be seen then, that the circuit of Fig. 7, will, by proper choice of circuit constants, amplify only signals of substantially instantaneous duration and only the difference between the signals reaching photocells VT1 and VT2.

Preferred values for the various elements shown in Fig. 7 are as follows:

Resistors

| | |
|---|---|
| R1 and R1' | .5 megohms ½ watt |
| R2 | 3 k. ½ watt |
| R3 | 50 k. ½ watt |
| R4 and R5 | 5 megohms ½ watt |
| R6 | 50 k. ½ watt |
| R7 and R8 | 200 k. ½ watt |
| R9 | 50 k. |
| R10 and R11 | 3 megohms ½ watt |
| R12 | 50 k. ½ watt |
| R13 | 2 k. ½ watt |
| R14 and R15 | 200 k. ½ watt |
| R16 | .5 megohms 1 watt |
| R17 | 5 k. 1 watt |
| R18 and R19 | 100 k. ½ watt |
| R20 | 25 k. ½ watt |
| R21 | 1000 ohms ½ watt |
| R22 and R23 | 1 megohm ½ watt |
| R24 and R24' | ¼ megohm ½ watt |
| R25 and R25' | 1 megohm ½ watt |
| R26 | .25 megohm watt |
| R27 | 50 k. watt |
| R28 | 25 k. watt |
| R29 and R29' | 100 k. watt |
| R30 and R30' | 5000 ohms watt |
| R31 and R31' | .25 megohm |
| R32 | .5 megohm |
| R33 | 1 megohm |
| R34 | .25 megohm ½ watt |
| R36 | 100 k. |
| R37 | 1000 ohms |
| R38 | 5 k. pot. WW 4 watt |
| R39 | 7.5 k. 1 watt |
| R40 and R40' | .5 megohm ½ watt |
| R41 | 2 megohms ½ watt |

Condensers

| | |
|---|---|
| C' | .1 μf. paper 400 v. |
| C2 and C2' | 200 μμf. mica |
| C3 | .0005 μf. mica |
| C4 | .0005 μf. mica |
| C5 | .25 μf. paper 400 v. |
| C6 and C7 | .001 μf. paper 600 v. |
| C8 | .5 μf. paper 400 v. |
| C9 and C10 | .001 μf. paper 600 v. |
| C11 and C12 | .01 μf. paper 600 v. |
| C13 | .1 μf. paper 400 v. |
| C14 | 1.0 μf. paper 400 v. |

Condensers—Continued

| | |
|---|---|
| C15 and C16 | .005 μf. paper 600 v. |
| C17 | Small amount of twisted wire |
| C18 | .1 μf. paper 400 v. |
| C19 | 1.0 μf. paper 400 v. |
| C20 | .25 μf. paper 400 v. |
| C21 | .1 μf. paper 400 v. |
| C22 | .001 μf. paper 600 v. |
| C23 | 1.0 μf. paper 400 v. |
| C25 | .25 μf. paper 400 v. |
| C26 | .01 μf. paper 600 v. |

Vacuum tubes

| | |
|---|---|
| VT1 and VT2 | Farnsworth Special Photocell |
| VT3, VT4, VT5, and VT6 | 12SJ7 |
| VT7 and VT8 | 12SH7 |
| VT9 | 12SL7 |
| VT10 | 12H6 |
| VT11 | 12SJ7 |
| VT12 | 12H6 |
| VT13 | 12SJ7 |

The interpreting circuit used in connection with the differential amplifier and automatic volume control circuit of Fig. 7 is shown in the schematic diagram of Fig. 8. In this figure, leads 200, 201 and 202 correspond to the leads of the same numbers in Fig. 7. Lead 200 is coupled to gas tube VT14 by condenser C27. The first grid of VT14 is biased at ground potential by resistors R43 and R42, while the cathode thereof is connected to a +4.5 voltage supply through resistors R48 and R47. The second grid of VT14 is directly returned to the same bias supply as the cathode. The plate of VT14 is connected to a 180-volt supply through resistances R46 and R56, R46 being by-passed by condenser C29.

Lead 201 is coupled to gas tube VT15 by means of condenser C24. The grid of this tube is biased at ground potential by resistances R42' and R44. The cathode of VT15 is connected to the +4.5 voltage supply through resistances R48' and R47. The second grid of V15 is directly returned to the same bias supply as the cathode. The plate circuit of VT15 includes resistances R45 and R56, R45 being by-passed by condenser C28.

The cathode of VT14 is coupled to double diode VT16 by means of resistance R49 and the cathode of VT15 is coupled to double diode VT17 by means of resistance R49'.

Between the cathode of VT14 and screen grid of VT20 there is provided a time circuit containing a resistance R50 and a condenser C30. Between the cathode of VT14 and the control grid of VT18, there is another time circuit, including the resistance R52 and condenser C32. The time circuit R50 C30 has a shorter time constant than the time circuit R52 C32. A resistance R54 is included in the grid circuit of VT18 to limit the grid current therein. The tube VT16 is connected across the time circuits to permit the rapid discharge of the condensers C30 and C32 at the end of the cycle.

Between the cathode of VT15 and screen grid of VT21 there is provided a time circuit containing a resistance R51 and a condenser C31. Between the cathode of VT15 and the control grid of VT19 there is another time circuit, including the resistance R53 and condenser C33. The time circuit R51 C31 has a shorter time constant than the time circuit R53 C33. A resistance R55 is included in the grid circuit of VT19 to limit the grid current therein. The tube VT17 is connected across the time circuits to permit the rapid discharge of the condensers C31 and C33 at the end of the cycle.

The cathodes of tubes VT18, VT19, VT20 and VT21 are all connected together. Between their common connection and ground there is provided a gas diode VT23. The shield grids of VT18 and VT19 are connected to a +45-volt supply. The common cathode junction of the tubes VT18, VT19, VT20 and VT21 is returned to plus 45 volts through the load resistor R57 and the decoupling network R56 and C34.

The control grid of VT20 is coupled to lead 201 through resistance R61 and condenser C38 and is connected to a 40.5-volt bias supply through resistances R61 and R58. The control grid of VT21 similarly is coupled to lead 200 through resistance R60 and condenser C37 and is connected to a 40.5-volt bias supply through resistances R60 and R59.

In the plate circuit of each of tubes VT18, VT19, VT20 and VT21 there is a relay. Relay RL1 is in the plate circuit of VT18. When the tube VT18 is conducting the relay RL1 closes switch S5, thus connecting terminal U5 with terminal U6 of a utilization circuit which may be the controls of a guided missile. A condenser C36 is used in parallel with RL1 as a storage of energy for maintaining a current flow through RL1 for a short time after VT18 has become non-conducting.

Relay RL2 is in the plate circuit of tube VT19. When VT19 is conducting, RL2 closes switch S6, thus connecting terminal U4 with terminal U3. An energy storing condenser C35 is supplied for RL2. In the same manner, the firing of tube VT20 operates through RL3 to close switch S7 and connect together terminals U7 and U8. The firing of VT21 likewise connects terminals U1 and U2 by means of switch S8 operated by RL4.

A time circuit R64 C41 is provided between the common cathode circuit of tubes VT18 through VT21 and the grid circuit of VT24. A resistance R62 is provided in the control grid circuit of VT24 to limit grid current therein. By-passing the resistance R64 is the double diode VT22, whose purpose is to permit the rapid discharge of condenser C41 when the circuit is returned to an inoperative condition. The cathode VT24 is by-passed to ground by means of condenser C42 and is returned to a plus 67.5-volt supply through resistor R63. The screen grid of VT24 is returned directly to the plus 67.5-volt supply. The plate load of VT24 consists of the parallel combination of R66 and C43. C43 is connected between the plate of VT24 and ground; R66 is connected between the plate and the plus 180 volts. The plate of VT24 joins the common plate circuit supply for all other gas tubes, namely VT14, VT15, VT18, VT19 and VT20 and VT21. Thus, when VT24 conducts, a large voltage is generated across R66 which lowers the plate voltages on the tubes mentioned above sufficiently to extinguish any of those tubes which are firing. The effect of the condensers C43 and C42 is such that vacuum tube VT24 is also extinguished at the same time as the other gas tubes. Condenser C44 is connected between the 180-volt supply and ground.

Preferred values for the various elements of Fig. 8 are as follows:

Resistors

| | |
|---|---|
| R42 and R42' | 1 megohm ½ watt |
| R43 and R44 | .25 megohm ½ watt |
| R45 and R46 | 100 k. ½ watt |
| R47 | 25 k. ½ watt |
| R48 and R48' | 40 k. ½ watt |
| R49 and R49' | 10 k. ½ watt |
| R50 and R51 | 100 k. ½ watt |
| R52 and R53 | .5 megohm ½ watt |
| R54 and R55 | 100 k. ½ watt |
| R56 | 2.5 k. 1 watt |
| R57 | 5 k. 1 watt |
| R58 and R59 | 1 megohm ½ watt |
| R60 and R61 | .25 megohm ½ watt |
| R63 | 100 k. ½ watt |
| R64 | 2 megohms ½ watt |

Condensers

| | |
|---|---|
| C24 and C27 | .001 µµf. 600 v. |
| C28 and C29 | .00025 µf. 600 v. paper |
| C30 and C31 | .01 µf. 600 v. paper |
| C32 and C33 | .02 µf. 600 v. paper |
| C34 | .25 µf. 400 v. paper |
| C35 and C36 | .5 µf. 400 v. paper |
| C37 and C38 | .001 µµf. 600 v. paper |
| C39 and C40 | .5 µf. 400 v. paper |
| C41 | .075 µf. 600 v. paper |
| C42 | .25 µf. 400 v. paper |
| C43 | .1 µf. 600 v. paper |
| C44 | 1. µf. 400 v. paper |

Vacuum tubes

| | |
|---|---|
| VT14, VT15, VT18, VT19, VT20, VT21, and VT24 | 2050 |
| VT16, VT17, and VT22 | 12H6 |
| VT23 | VR90 |

NOTE: Filaments of VT14 and VT15 should be connected in series. Filaments of VT18 and VT20 should be connected in series. Filaments of VT19 and VT21 should be connected in series.

In the operation of the circuit shown in Fig. 8, it is advisable to consider first the conditions existing at the beginning of a control cycle when none of the gas tubes is conducting. At this time, there exists a bias of minus 4.5 volts between the control grids of VT14 and VT15 and their respective cathodes. The shield grids of tubes VT20 and VT21 are at plus 4.5 volts potential, referred to ground, because there is no charge on the condensers C30 or C31, respectively. The control grids of VT20 and VT21 are at plus 40.5 volts, while the cathodes of these tubes are at approximately plus 45 volts. Thus, in each of the tubes VT20 and VT21, there is a negative bias of 4.5 volts between the control grids and cathodes and a negative bias of 40.5 volts on the shield grids with respect to the cathodes.

Both the shield grids and cathodes of tubes VT18 and VT19 are at a plus 45 volts potential, while the control grids of these two tubes are at plus 4.5 volts potential. Thus, only the control grids of these two tubes have a negative bias with respect to their cathodes.

When a positive pulse enters the circuit from lead 200, it triggers tube VT14. As this tube conducts, the potential of its cathode is raised considerably above plus 45 volts, causing a charge to flow into condensers C30 and C32, the time constant of the charging circuit of C30 being shorter than that of C32. Hence, the potential across C30 rises more rapidly than that across C32, and the shield grid of tube VT20 is raised sufficiently to allow that tube to be triggered by a signal on its control grid, if one occurs in the short interval of time before the control grid of VT18 is raised sufficiently to trigger VT18. Accordingly, either VT20 or VT18 will fire, depending on whether or not a positive signal appears on lead 201 during the specified interval. When either tube does fire, the cathode potential of all tubes VT18 through VT21 is raised, due to their common cathode resistors R56 and R57, placing a large negative bias on the control grids of the nonconducting tubes with respect to their cathodes. This bias prevents these tubes from firing as long as the conducting tube continues to conduct.

It should be pointed out that, due to the large common cathode resistance R47 in the circuits of VT14 and VT15 when one of these tubes is conducting, the cathode of the other tube is raised to such a large potential with respect to its grid, that a signal tending to fire that tube will be ineffective to permit it to fire. Thus, if VT 14 is firing as described above, and a positive signal appears on lead 201, this positive signal cannot fire VT15.

It should be noted that VT23 is connected between the common cathode junction of tubes VT18 through VT21 and ground. When the potential at this common junction rises due to the conduction of one of tubes VT18 through VT21, VT23 will be made conducting and will allow a large current flow to pass through the particular tube that is firing, thereby enabling the relay in the plate circuit of that tube to close the switch associated therewith and to allow the condenser, in parallel with the relay, to store up sufficient energy to maintain said relay closed after its associated tube has become nonconducting.

VT23 also has an important voltage regulating function, in that once it starts to conduct, the voltage drop thereacross will be constant. This voltage is preferably around 90 volts and therefore, the charging voltage for the circuit R64 C41 will remain constant. It is important that the charging voltage of the time constant R64 and C41 be held constant, since the rate of charge on the condenser C41 determines the time at which the tube VT24 will fire and therefore, controls the length of the cycle. Since, when VT24 conducts, it lowers all of the plate potentials of the tubes VT14 and VT15, and VT18 through VT21, it will extinguish any of those tubes which are firing. After VT24 has conducted for a short time, it will extinguish itself, due to the action of the condensers C42 and C43. At this point, the circuit will return to the condition assumed at the beginning of this discussion. The circuit is then ready for the next signal.

In summation, it can be seen that the following conditions hold true of the circuit shown in Fig. 8. If a single positive pulse enters the circuit from lead 200, after a short delay VT18 fires. But, if a positive pulse entering the circuit from lead 200 is followed promptly thereafter by a positive pulse from the lead 201, VT20 fires. Conversely, if a single positive pulse enters the circuit from lead 201, after a short delay, VT19 fires. But, if a positive pulse entering the circuit from lead 201 is followed by a positive pulse entering the circuit from lead 200, VT21 fires.

Assuming that VT18 corresponds to an "up" signal, VT19 to a "down" signal, VT20 to a "right" signal, and VT21 to a "left" signal, the operation of this circuit on signals generated by a transmitter of the type shown in Fig. 6 can be readily understood. If an up signal is generated in Fig. 6, it will consist of a single flash by TVT1 of Fig. 6. Assume then, that TVT1 and VT1 of Fig. 7 have similar light polarizers and light filters in front thereof. A single signal generated by TVT1 will energize VT1 and produce a positive pulse in lead 200 of Fig. 7 and Fig. 8. This single positive pulse, as explained, will fire VT18. Assume now, that a right signal is given in the transmitter of Fig. 6. This consists of a flash by TVT1 followed promptly by a flash by TVT2. The flash of TVT1 produces a positive pulse in lead 200 of Figs. 7 and 8, and the flash from TVT2 produces a positive pulse in the lead 201 of Figs. 7 and 8. As previously explained, this combination of pulses will fire tube VT20. By this same reasoning a down signal will fire VT19 and a left signal will fire VT21.

The time constant R64 and C41 which controls the firing of VT24 of Fig. 8 is closely coordinated with the charging condenser in parallel with the various relays of Fig. 8, and also with the timing of the rotation of the commutator 110 in Fig. 6. The reason for this is that it is desired to fire the various tubes VT18 through VT21, close the corresponding relays, and store up enough energy in the condensers to keep those relays closed for an appreciable time, and then extinguish tubes VT18 through VT21 so that the circuit may be made ready for the next signal.

Suppose, for example, it is desired to effect both an up and right control simultaneously, by closing both switch S1 and S2. Looking at Fig. 6, when the shorting bar 111 reaches contacts 112 attached to line E, an up signal is produced because switch S1 is closed. This signal is transmitted by TVT1 and, as explained previously, fires tube VT18 of Fig. 8. This tube closes relay RL1 and charges condenser C36. When a sufficient charge in C36 has been built up, the time constant R64 C41 will trigger VT24, thus extinguishing VT18. The condenser C36, however, will maintain the switch S5 closed while the shorting bar 111 of the commutator 110 in Fig. 6 reaches contacts 113 and 114, and, since S2 is closed, a right signal is transmitted, and VT20 fires, closing switch S7. Thus, both a right and an up signal can automatically alternately be fed to the utilization circuit, and two final relays can be kept closed simultaneously. When the other end of the shorting bar 111 of the commutator 110 reaches contact 112, the operation can be repeated. Thus, by means of this circuit, two appropriate switches may be maintained continuously closed, while the signals energizing the circuit are of substantially instantaneous duration.

Since certain changes in carrying out the above process and in the constructions set forth which embody the invention may be made without departing from its scope, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a light sensitive receiver, a first and a second light sensitive device each responsive to individualized signals thereto, an amplifier responsive to the difference in response of said first and second light sensitive devices to produce a signal whose polarity depends upon which of said light sensitive devices is producing the stronger response, a first pair of normally non-conducting grid controlled gas tubes connected to said amplifier and responsive to the polarity of a signal from said amplifier to render one or the other of said tubes conducting, and means responsive to the conduction of one tube to render the other tube unresponsive to signals from said amplifier, a short time interval charging circuit and a long time interval charging circuit connected with each of said first pair of gas tubes, a second pair of normally non-conducting gas tubes having control grids connected to said long time interval charging circuits respectively, a third pair of normally non-conducting gas tubes each having a control grid and a biasing grid, said biasing grids being normally biased to render said tubes non-responsive to the control grids and connected with said short time interval charging circuits respectively to render said third pair of tubes responsive to said control grids when the respective one of said first pair of gas tubes is conducting, means responsive to conduction of any one of said second and third pairs of gas tubes to render the remainder of said tubes unresponsive to the control grids thereof, and connections from the output of said amplifier to the control grids of said third pair of gas tubes, whereby a sequence of two signals from said amplifier will render one or the other of said third pair of tubes conducting while a single signal will render one or the other of said second pair of tubes conducting, time delay means to render said first, second, and third pairs of gas tubes non-conducting after a predetermined time interval, and utilization means connected in the output circuits of said second and third pairs of tubes.

2. In a communication system a first and a second flash tube, a first and a second light sensitive device, a first pair of light polarizing filters each having a first predetermined polarization axis associated with first flash tube and said first light sensitive device respectively, a second pair light polarizing filters each having a second polarization axis perpendicular to said first polarization axis associated with said second flash tube and said second light sensitive device respectively, an energization circuit for each of said flash tubes, a motor-operated switch element, a plurality of spaced fixed contacts co-operating with said motor operated switch element and a plurality of manually operative selector switches interconnecting said fixed contacts and said energization circuit, whereby said motor-operated switch element causes energization of said flash tubes in a selected sequence and at predetermined intervals, an amplifier circuit responsive to differences in response between said first and second light sensitive devices to produce a polarized signal therefrom, integrating means connected to said amplifier, and circuit means responsive to said integrating means to control the gain of said amplifier, a first pair of normally non-conducting gas tubes responsive to the polarity of the signal from said amplifier to render one or the other of said tubes conducting and means responsive to the conduction of either tube to render the other of said first pair of gas tubes unresponsive to signals from said amplifier device, a short time constant charging circuit and a long time constant charging circuit connected in the output circuit of each of said gas tubes, a second pair of grid controlled gas tubes having their grids connected to said long time constant charging circuit respectively, a third pair of gas tubes each having a biasing grid and a control grid, said biasing grids being normally biased to maintain said third pair of tubes unresponsive to the control grids thereof and connected to said short time constant charging circuits respectively to render said tubes responsive to the control grids, means connecting the control grids of said third pair of gas tubes to the output of said amplifier, whereby said third pair of gas tubes is responsive to subsequent signals therefrom, means associated with said second and third pairs of gas tubes responsive to conduction of any one of said tubes to render the remainder of said second and third pairs of tubes unresponsive to signals, time delay means responsive to the conduction of any one of said tubes to render said first, second and third pairs of gas tubes non-conducting, and slow-opening relay means connected in the output circuits of said second and third pairs of gas tubes respectively, whereby said relay means reproduce the operation of said selector switches.

PAUL H. LEE.

REFERENCES CITED

The following references are of record in the file of this patent:

UNITED STATES PATENTS

| Number | Name | Date |
|---|---|---|
| 1,501,711 | Heising | July 15, 1924 |
| 1,642,011 | Chubb | Sept. 13, 1927 |
| 1,997,628 | Chubb | Apr. 16, 1935 |
| 2,014,174 | Francis | Sept. 10, 1935 |
| 2,025,912 | Swart | Dec. 31, 1935 |
| 2,031,639 | Finch | Feb. 25, 1936 |
| 2,032,588 | Miller | Mar. 3, 1936 |
| 2,075,084 | Chubb | Mar. 30, 1937 |
| 2,110,358 | Dreisbach | Mar. 8, 1938 |
| 2,131,042 | Halstead | Sept. 27, 1938 |
| 2,137,278 | George et al. | Nov. 22, 1938 |
| 2,179,954 | Ranger | Nov. 14, 1939 |
| 2,188,293 | Williams | Jan. 23, 1940 |
| 2,237,950 | Pineo | Apr. 8, 1941 |
| 2,277,698 | Germeshausen | Mar. 31, 1942 |
| 2,312,093 | Hammond, Jr. | Feb. 23, 1943 |
| 2,381,928 | Roberts | Aug. 14, 1945 |
| 2,409,030 | Fraenckel | Oct. 8, 1946 |
| 2,423,254 | Rettinger | July 1, 1947 |
| 2,457,502 | Shepherd | Dec. 28, 1948 |
| 2,465,925 | Purington | Mar. 29, 1949 |
| 2,478,904 | Edgerton | Aug. 16, 1949 |
| 2,478,905 | Edgerton | Aug. 16, 1949 |
| 2,478,908 | Edgerton | Aug. 16, 1949 |
| 2,484,837 | Lake | Oct. 18, 1949 |
| 2,531,951 | Shamos et al. | Nov. 28, 1950 |